May 19, 1931.   C. A. UPSON ET AL   1,806,006
BOARD MAKING MACHINE
Filed March 10, 1927   10 Sheets-Sheet 1

INVENTORS
Charles A. Upson
Otto R. Winter
BY
their ATTORNEYS

Fig. 4

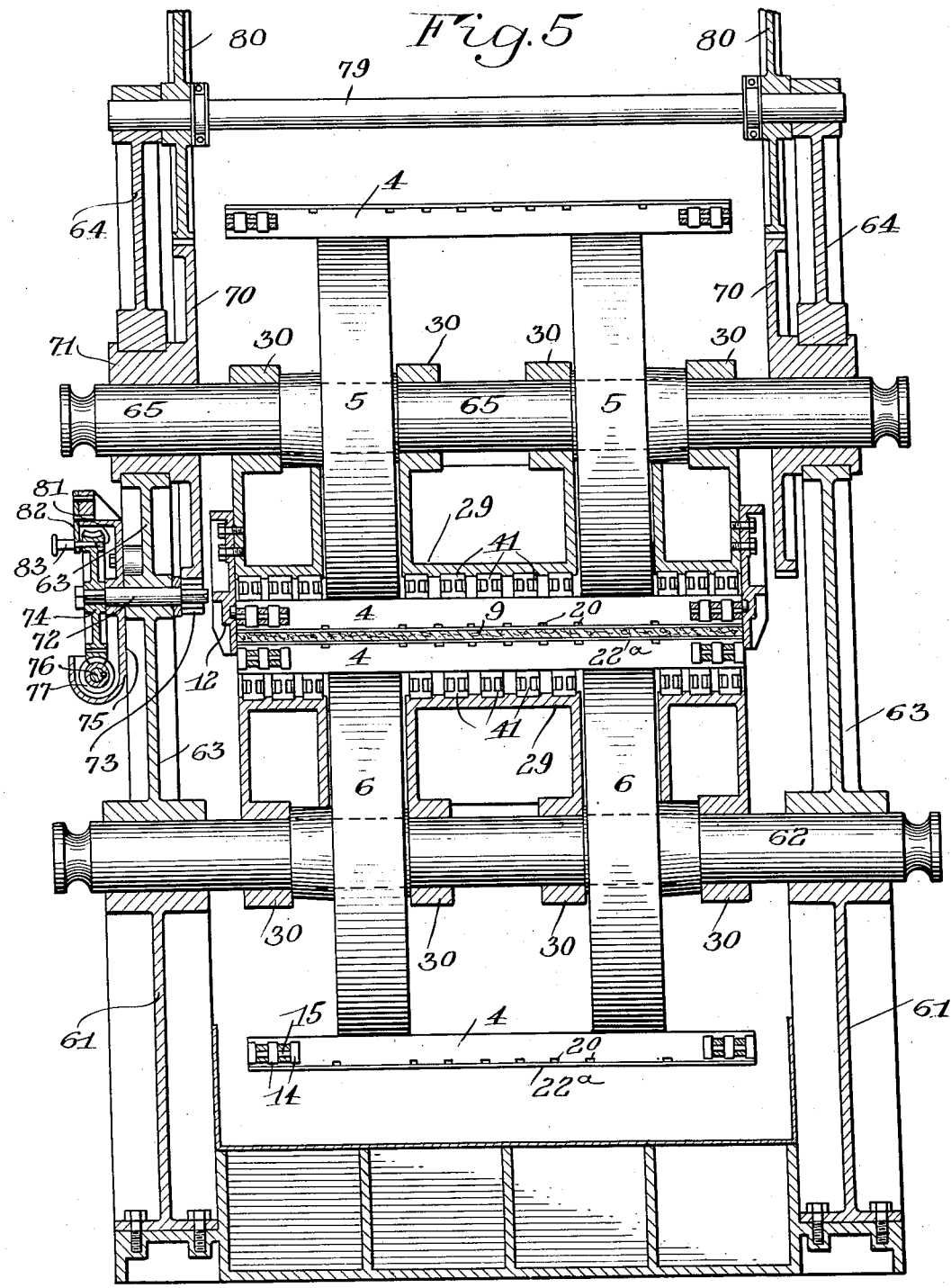

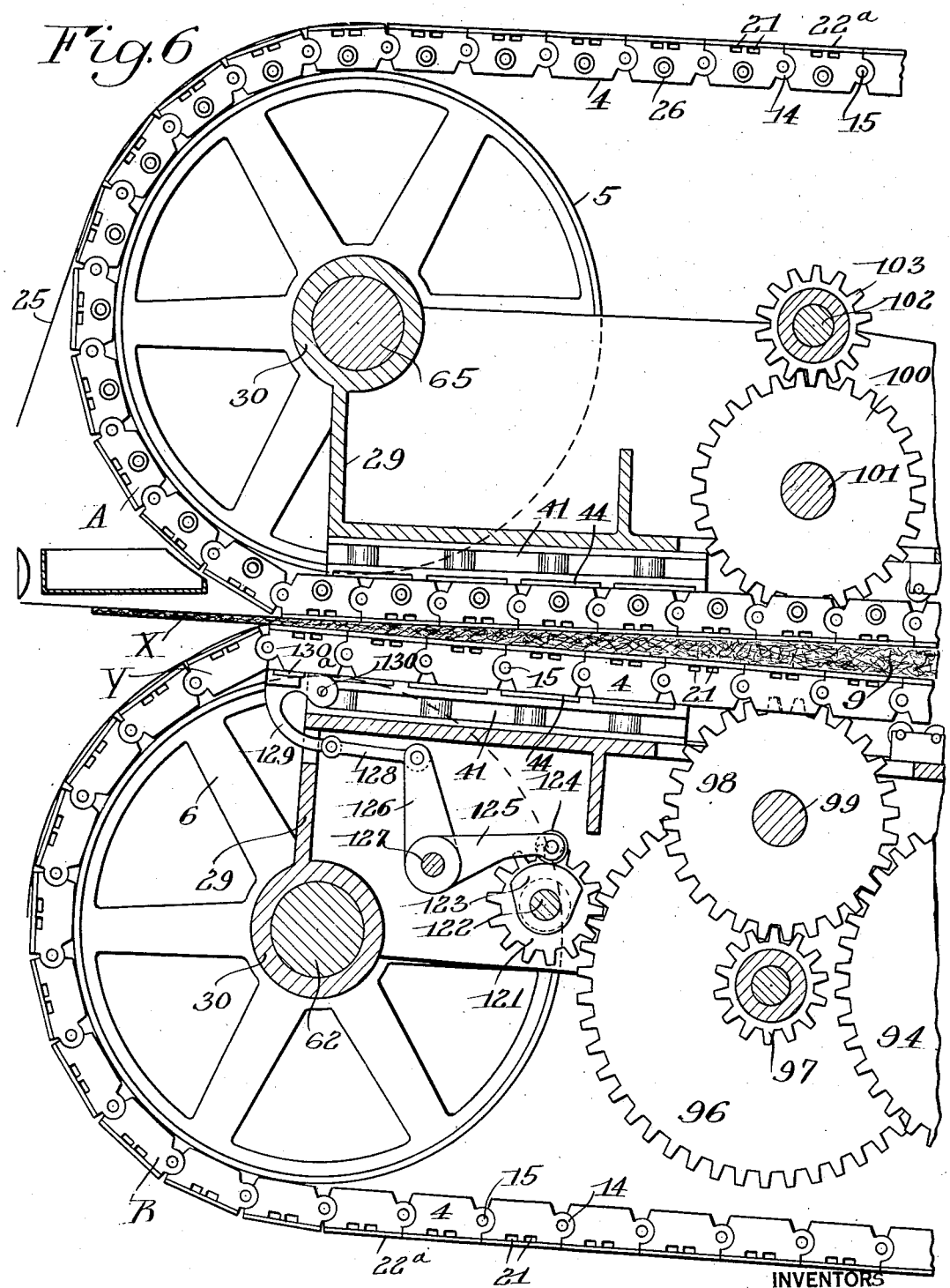

May 19, 1931.   C. A. UPSON ET AL   1,806,006
BOARD MAKING MACHINE
Filed March 10, 1927    10 Sheets-Sheet 7
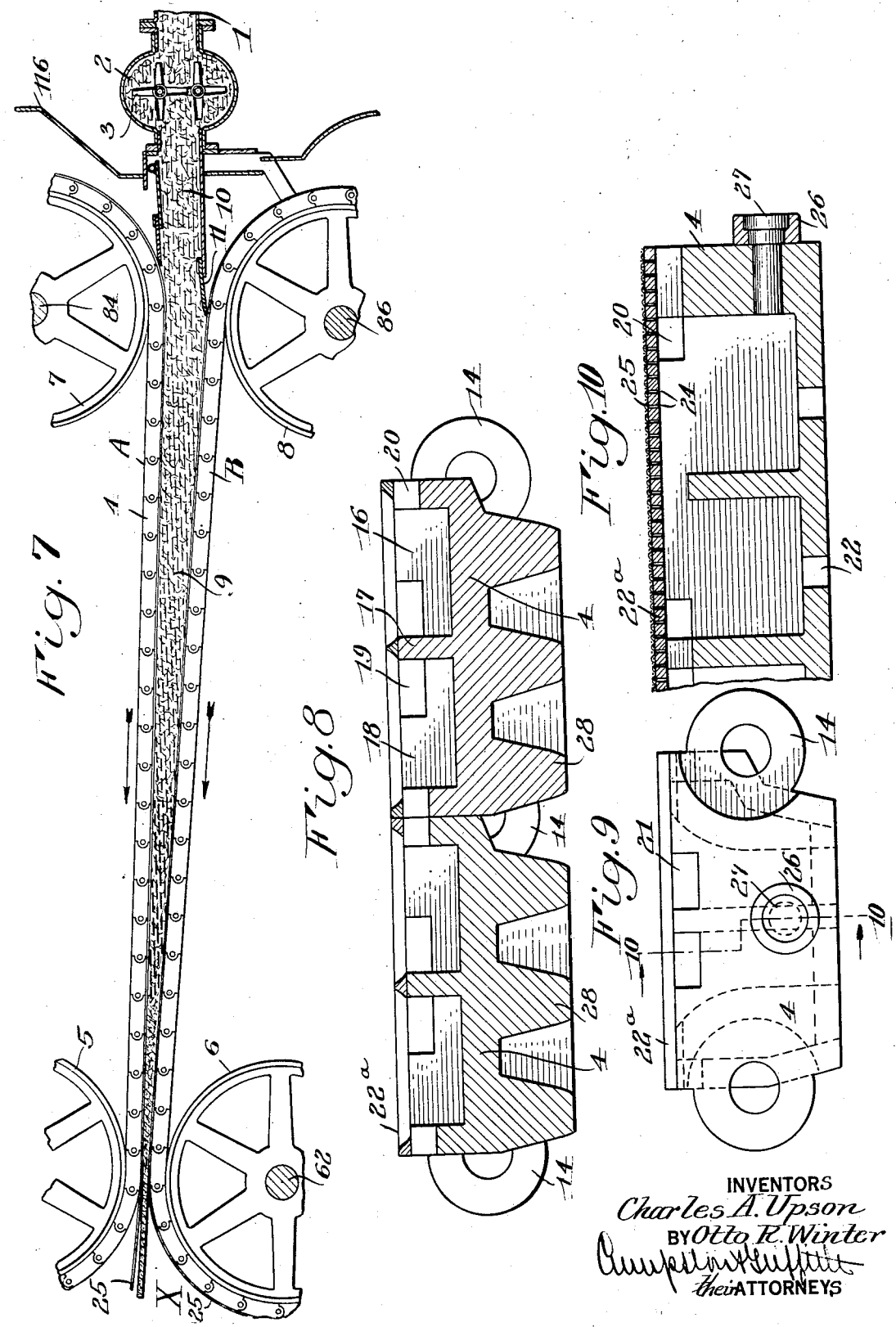
INVENTORS
Charles A. Upson
BY Otto R. Winter
their ATTORNEYS

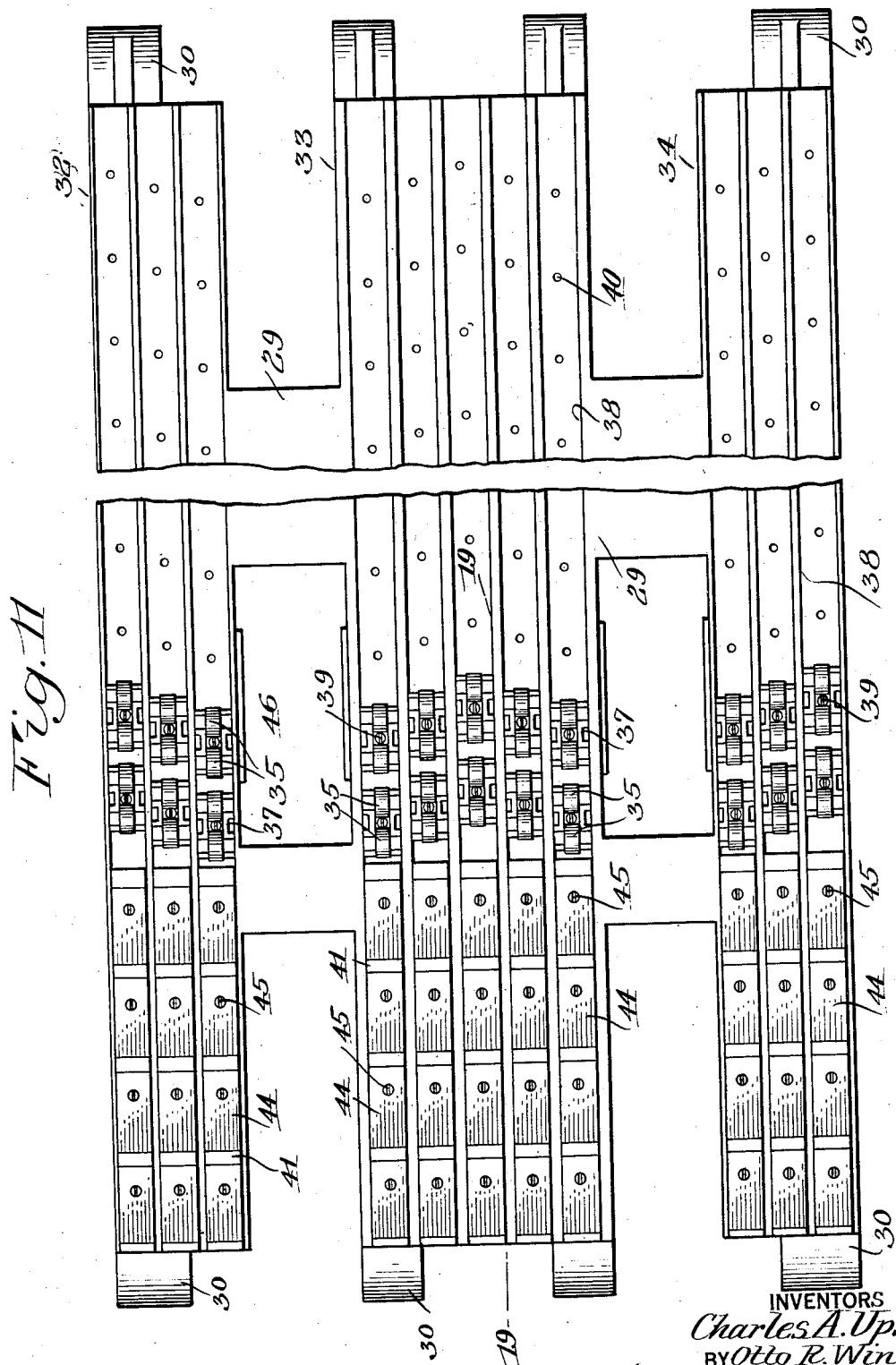

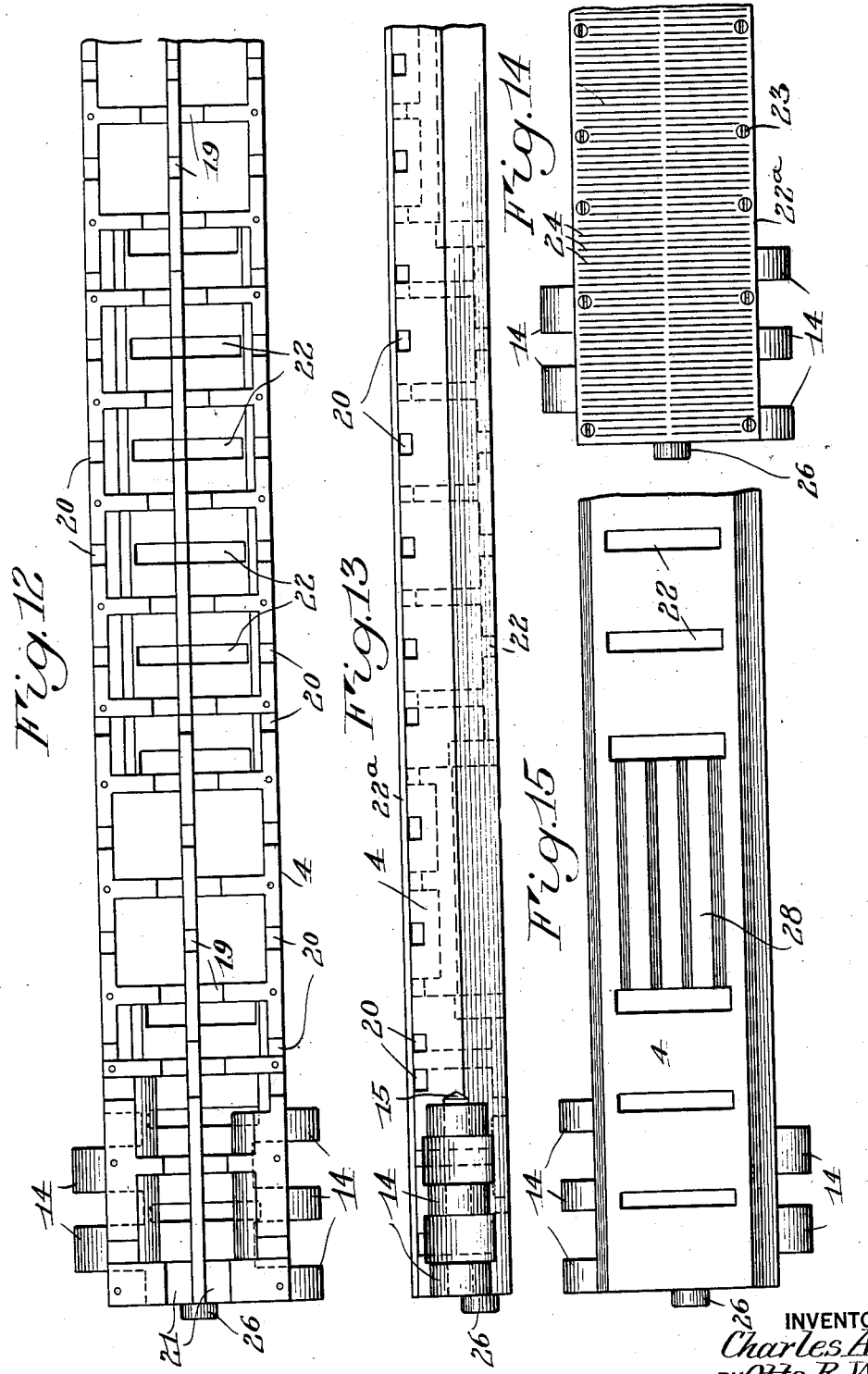

May 19, 1931.  C. A. UPSON ET AL  1,806,006
BOARD MAKING MACHINE
Filed March 10, 1927  10 Sheets-Sheet 10
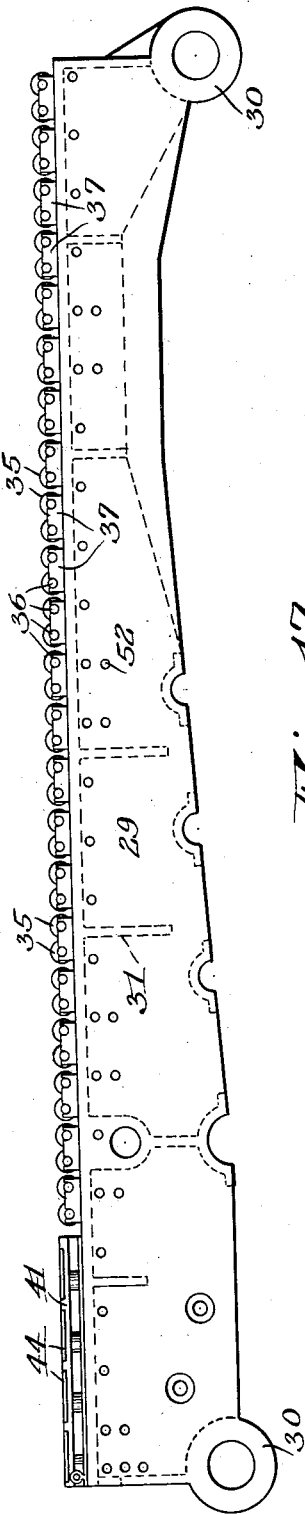
INVENTORS
Charles A. Upson
BY Otto R. Winter
their ATTORNEYS Patented May 19, 1931

1,806,006

UNITED STATES PATENT OFFICE

CHARLES A. UPSON AND OTTO R. WINTER, OF LOCKPORT, NEW YORK, ASSIGNORS TO THE UPSON COMPANY, OF LOCKPORT, NEW YORK, A CORPORATION OF NEW YORK

BOARD MAKING MACHINE

Application filed March 10, 1927. Serial No. 174,316.

Our present invention relates to paper making, pulp pressing and similar machines for forming plastic materials, and it has for its object to provide an efficient and serviceable machine of this character for forming relatively heavy paper or similar boards. A further object of the invention is to provide a machine that will form such a product under great pressure and as a continuous run. The improvements are directed toward various features of the machine such as will hereinafter shortly appear, and to these and other ends they consist of certain improvements and combinations of parts, all as will be hereinafter described, the novel features being pointed out in the claims at the end of the specification.

In the drawings:

Figure 4 is a transverse section on the line 4—4 of Figure 1;

Figure 5 is a transverse section on the line 5—5 of Figure 1;

Figure 6 is an enlarged fragmentary longitudinal section at the delivery end of the machine;

Figure 7 is a longitudinal fragmentary section through the feeding and pressure chamber with many of the parts removed;

Figure 8 is an enlarged transverse section through two contiguous link bars of the pressure flights;

Figure 9 is an enlarged end view of one of the link bars;

Figure 10 is a fragmentary section on the line 10—10 of Figure 9 looking in the direction of the arrow;

Figure 11 is a plan view of one of the pressure beds supporting the pressure flights, the same being partly broken away and some of the roller bearings being removed;

Figure 12 is a fragmentary top plan view of one of the link bars with the face plate removed;

Figure 13 is a side view thereof.

Figure 14 is a fragmentary top plan view of one of the link bars with the face plate in place;

Figure 15 is a bottom plan view of the same fragment;

Figure 16 is a side elevation in detail of the pressure bed frame;

Figure 17 is a side view or elevation of the inner side of one of the cheek plates or side pressure members;

Figure 18 is an enlarged end view of one of the roller bearing elements on the pressure bed;

Figure 19 is a side view thereof;

Figure 20 is an enlarged fragmentary section taken longitudinally through a portion of the delivery end of the bed on the line 19—19 of Figure 11;

Figure 21 is a fragmentary section on the line 21—21 of Figure 20; and

Figure 22 (Sheet 3) is an enlarged fragmentary section through the pressure chamber at one side showing one of the cheek plates in transverse section.

Similar reference numerals throughout the several views indicate the same parts.

Figure 1:
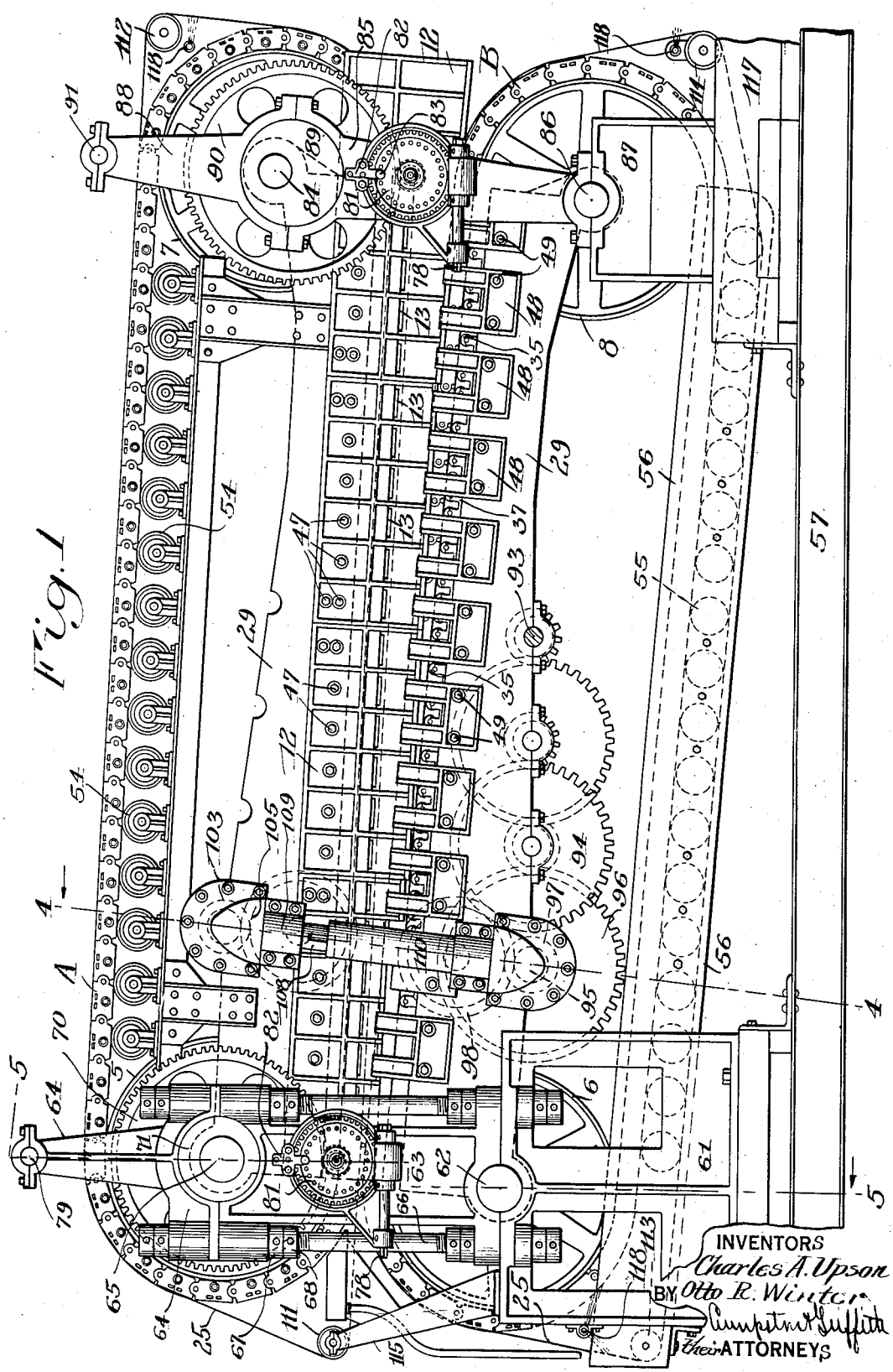
Figure 1 is a side elevation of the board forming machine constructed in accordance with and illustrating one embodiment of our invention, certain of the parts being removed to reveal the working mechanism.

To first give a general idea of the machine herein illustrated and described as an embodiment of our present invention we may say that this machine is designed for making continuous lengths of heavy fiber board or heavy fiber sheets from paper pulp or admixtures thereof of which the ordinary wood fibers known to the paper making art are the sole or principal constituent. It is to be understood however, that the range of our invention is not limited to any particular material and the following description will be conducted merely as an illustration of the workings of the invention as applied to the manufacture of a heavy paper board from a stock consisting of wood pulp fibers, such boards being applicable commercially, for instance to building and other construction uses.

With this understanding, a heavy fiber paper board is produced on the present machine in a paper making way to the extent that the wood or similar fibers are held in suspension in a surplus of water and so fed into the receiving end of the machine to a drainage and pressure chamber; the water is drained off and as the fibers that it carries are thereby coagulated and intermixed they are carried progressively through a pressure chamber of constantly narrowing proportions so that finally they are subjected to great mechanical pressure to squeeze out all of the "free" water and finally emerge in the form of a solid though damp continuous board. The stock is introduced at the receiving end of the machine under sufficient pressure to initially prevent back pressure or slippage.

Specifically, the present machine provides means for feeding a volume of pulp or similar stock embodying an excess of water between the larger opening ends of the flights of two endless carriers which are convergent toward the delivery end of the machine and consist of a multiplicity of articulated bars that provide plane surfaces along each flight and, in conjunction with side walls or what will hereinafter be termed "cheek plates", a pressure chamber.

Of course the separation of these flights at both the receiving end and the delivery end of the machine as they may be adjusted either relatively or in unison regulates the ultimate thickness of the board produced, and other considerations governing its successful formation. Constructions permitting adjustability to these ends; provisions for drainage; driving connections for the various parts; the general construction of the machine to insure sufficient strength to withstand the tremendous pressure, and other related features are the things which we have improved and toward which our invention is directed.

We will first describe the pressure or forming chamber of the machine and the manner in which the stock is gradually reduced to solid form and in this connection call particular attention to Figures 5, 6 and 7 of the drawings.

*Pressure or forming chamber*

Referring to Figure 7 particularly the stock consisting of fiber or other solid matter suspended in an excess of water is pumped in at what we will call the rear of the machine through a throat 1. It is unnecessary to describe this feeding mechanism more than briefly inasmuch as it forms the subject matter of a prior application of Charles A. Upson, one of the joint applicants herein, filed on or about October 15, 1926, Serial No. 141,831. The stock passes from the throat into a mixing chamber 2 provided with suitable beaters 3 and thence between the opposed flights indicated generally at A and B respectively of a pair of endless articulated pressure members each composed of a plurality of bars 4 that will later be described in detail. These pressure members travel over and are generally supported by a pair of band wheels 5 and 6 at the front or delivery end and 7 and 8 at the rear or feed end. Between the mixing chamber 2 and the pressure chamber 9 that is comprised between the flights is a passageway 10, the upper and lower walls of which are provided with suitable flexible contact members 11 that make such close contact with the flights as they reach the approximate centers of the band wheels as to provide a substantially water tight connection.

The centers of the band wheels are so arranged that the flights A and B converge toward the front end of the machine and they travel in that direction as indicated by the arrows. The material that they carry is therefore progressively squeezed into a smaller and smaller space. Provision is made and will be hereinafter described for draining off the expressed water which may reach as high as ninety percent of the volume of the stock at the receiving end so that when the product indicated at X emerges from the front end it is a highly compressed solid though moist board that is later dried to the proper strength. These statements will give an idea of the amount of stock that must be pumped in at the feeding end in order that the solid body may rapidly accumulate itself, it being obvious to any paper maker that the constituency of the stock, its pressure and the rate of feed and the speed of travel of the flights A and B must all be correlated with the degree of convergency of the flights and the extent of the opening between them between the band wheels 5 and 6 at the delivery end which opening determines the thickness of the ultimate product.

Side walls for the pressure or forming chamber 9 are supplied by cheek plates 12 (Figure 5) also shown in Figure 22 secured to the frame of the machine and which will be hereinafter described more in detail. It is sufficient at present to call attention to the fact that they are provided with drainage openings 13 through which water passing through the flights may escape. The flight elements 4 travel very closely against these cheek plates and against renewable wear plates 14a secured to the surfaces thereof.

*The flight members or link bars*

Details of our preferred construction of the link bars 4 constituting the pressure members or flights A and B are best shown in Figures 8, 9, 10 and 12 to 15. Each consists of a heavy (preferably bronze) casting or body portion 4 and each has at its ends lugs 14 projecting in a complementary manner, one toward the other set on the adjoining bar to form hinge knuckles turning on pintles 15. As shown in Figure 8, the centers of these pintles are so located that in one direction of turning movement the flat side faces of the bars abut and lock against each other so that their outer faces will jointly constitute flat smooth even surfaces for each of the flights A and B. There is a clearance, however, in the other turning direction so that the bars may conform to and travel on the peripheries of the band wheels.

The bar castings are hollow on their outer sides, that is they are provided with a substantially continuous cavity or passage 16 interspersed with longitudinal and transverse walls 17 and 18 constituting strengthening ribs, which however are provided with a multiplicity of drainage openings 19 so that free flowing communication is had throughout the length of the bar. The side walls are also provided with drainage openings 20; the end walls with drainage openings 21 and the bottom wall with drainage openings 22 the general idea being that the bars are to be made as strong as possible and still afford maximum opportunity for the water expressed from the material in the pressure chamber 9 to escape.

The outer or contact faces, which must be very carefully formed, are constituted by plates 22a bridging the hollow interior and secured in place in the present instance by screws 23. These plates are foraminous and we prefer to form the fine openings therein by milling out two longitudinal rows of very fine slots 24 as shown in Figures 10 and 14. These slots must be large enough so that they will not be easily clogged yet small enough to prevent the passage of the paper fibers or other solid matter therethrough; large enough to accommodate the escaping water from the pressure chamber 9 and yet small enough to still maintain a pressure in the forming chamber 9.

In this connection it may be now stated that we prefer to further strain the escaping liquid and control the surfacing of the product as it is formed in and progresses through the pressure chamber 9 by covering the flights A and B and hence the surfaces of the link bars just described with a gauze screen 25 (Figures 6, 7 and 10) one of which is provided to travel as an endless belt along with and on the outer surface of each of the flight chains A and B. This may be the usual screen known to paper makers.

It will thus be seen that as the paper or other stock containing a great excess of water is fed or pumped in at the large or feeding end of the forming chamber 9, it is progressively reduced by a combination of the hydraulic and mechanical pressure and the escape of the water through the screens 25, the slots of the link bar faces 24 and thence out through the numerous passages provided in all sides of the bars. It will be noted that all of these bars upon both upper and lower flights become inverted and at some time during its travel each reaches every possible drainage position that would tend to best allow the escape of the water that it may have carried from its position in the pressure chamber.

At the end of each link bar 4 and at each end thereof is a projecting roller 26 on a stud 27. These are for supporting and guiding purposes about to be described. Also near each end of each bar on the bottom thereof is also provided a group of gear teeth 28 best shown individually in Figure 15. These are for the purpose of driving the flights, the band wheels 5, 6, 7, 8 being idlers. When the bars are straightened out together to provide the plane surfaces required in the pressure chamber 9, these teeth 28 as shown in Figure 8 provide a continuous rack for the engagement of a driving gear hereinafter described.

*The pressure beds*

It will be gathered from the foregoing and is obvious that the flights A, B during their opposed travel in forming and maintaining the pressure chamber 9 must be very solidly backed up and supported. We hence arrange for them to travel between the centers of the respective pairs of band wheels upon pressure beds 29 best shown in Figures 11 and 16 to 21 inclusive and supported in a manner hereinafter described by means of bearing lugs 30 at the two ends thereof. There is an upper bed and a lower bed that may be duplicates of each other, each consisting of a channel frame having strengthening cross ribs 31 and track portions indicated generally at 32, 33 and 34 upon their outer faces. Secured to these track portions throughout a major portion of their lengths are a multiplicity of roller bearings 35, groups of which are shown upon each track in Figure 11, the remainder being omitted. The rollers are shown in detail in Figures 18 and 19. We prefer to mount them in pairs upon shafts 36 carried by brackets 37. The latter are fastened to the bed in suitably spaced relationship between gibs 38 by screws 39 taking into screw holes 40. We prefer to arrange the brackets and rollers in the weaving or staggered relationship shown in Figure 11 so that they are out of line transversely of the bed and no pair or row will take all of the pressure of any link bar 4 at the same time.

Beginning at the feed end of the bed and of the pressure chamber the bars of the flights A and B travel smoothly and with perfectly solid support over these roller bearings 35 for a major portion of the length of the bed. It is apparent, however, that as the delivery end is approached at the very narrowest portion of the convergent pressure chamber which is occupied by the then substantially solid material, the pressure greatly increases. We therefore, provide the bed in this region with solid block tracks 41 secured between the gibs 38 by bolts 42 occupying countersinks 43 in the tracks. These bring the surface of the bed up to the level of the tangential surfaces of the bearing rollers 35 and the link bars of the flights slide from one to the other with ease and are absolutely solidly supported where the stress is greatest.

These tracks 41 over which the flights thereafter slide to the delivery point are surfaced with a plurality of wear plates 44 of hardened material which may be renewed individually and which are set into the track and secured by screws 45. They have the incidental function of covering the countersinks 43 and protecting the bolts 42.

The bed frames 29 are provided with openings 46 and the rack teeth 28 of the link bars travel over or in alignment therewith so that they may be driven by the gearing hereinafter described.

The cheek plates 12 before referred to as constituting the side walls of the pressure chamber 9 are carried by one of these frames 29, in the present instance, the upper one to which they are suitably secured as by the bolts 47 (Figures 5 and 22). Reinforcing members are provided to support or back up these cheek plates and they consist in the present instance of brackets 48 secured by bolts 49 to the opposite or lower frame 29. These brackets and outer surfaces on the cheek plates are faced off at 50, however, to permit a relative sliding movement in view of the relative adjustments of the bed frames themselves hereinafter described. Corresponding bolt holes through which the cheek plates and bed frames are secured together are shown at 51 in Figure 17 and 52 in Figure 16.

Referring more particularly to Figures 5 and 17, the cheek plates 12 are provided with longitudinal guiding grooves 53 which take the rollers 26 on the ends of the link bars 4 of the flights before referred to. The purpose of this guideway is to support the flights (which collectively weighs several tons in the present machine) when the machine is out of work. That is when there is no pressure in the forming chamber 9. Otherwise it will be seen that the upper flight A would sag badly and scrape against the lower flight.

Figure 2:
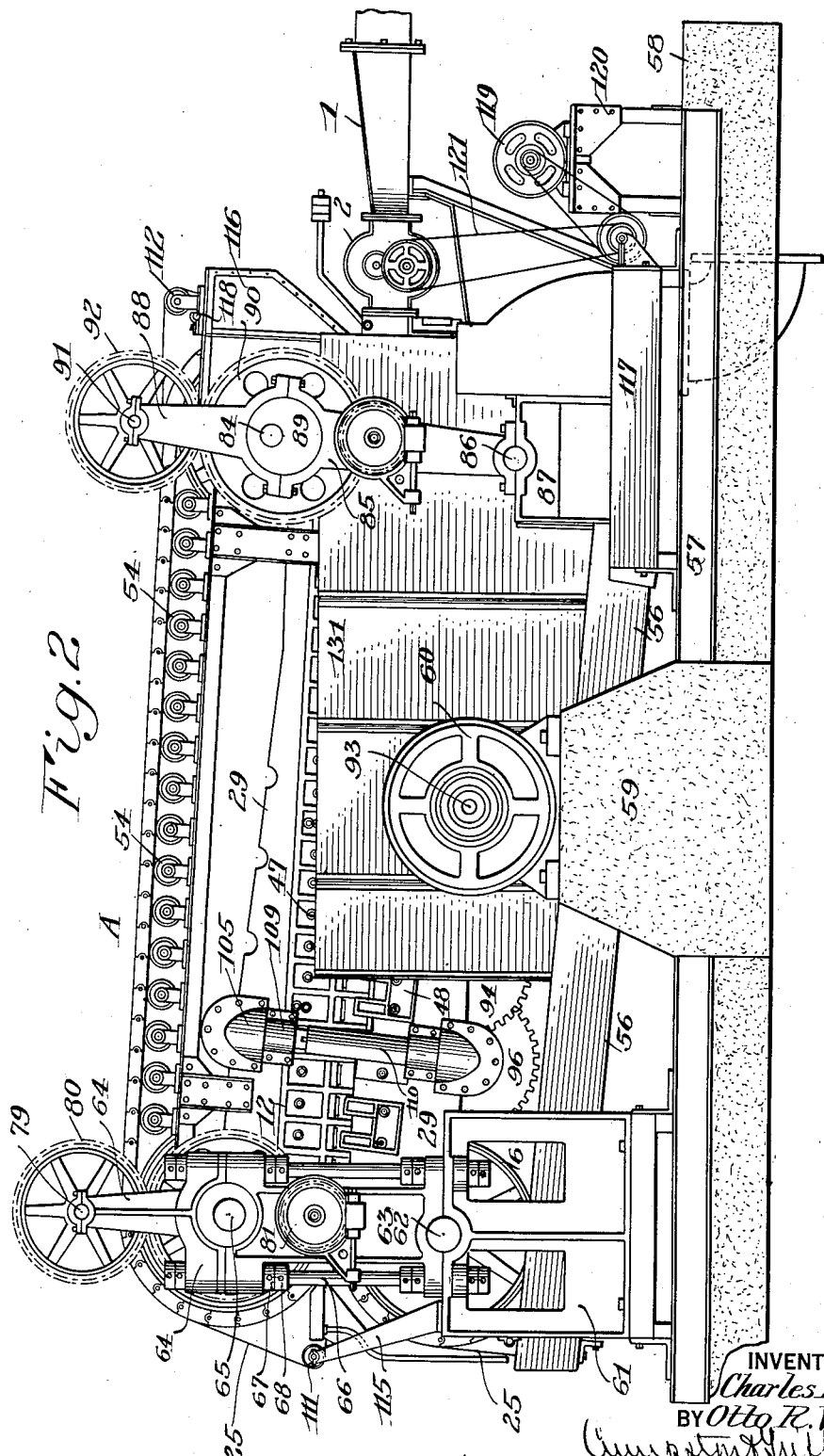
Figure 2 is a full side elevation of the machine on a somewhat reduced scale.
Figure 3:
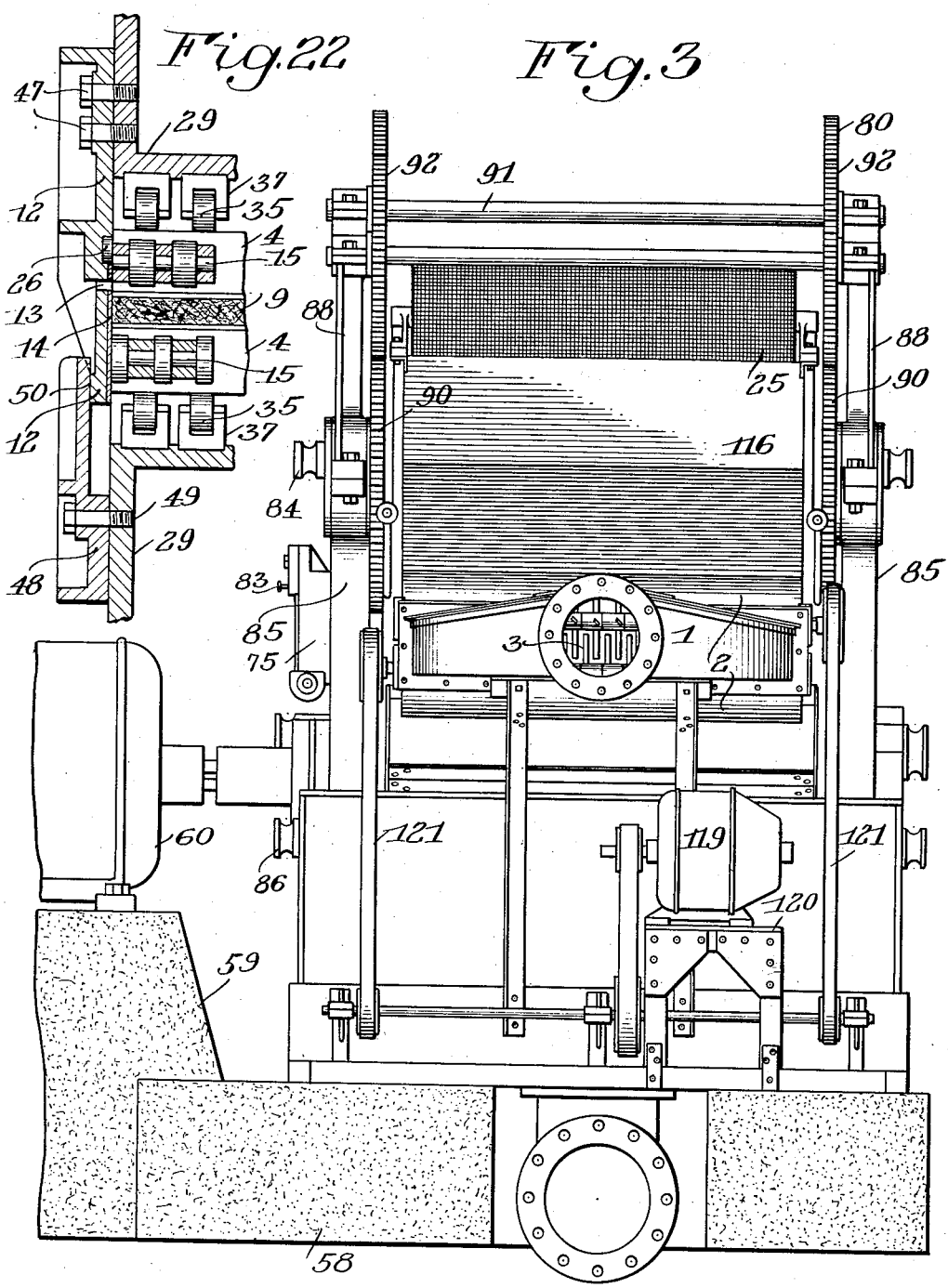
Figure 3 is a rear end view with some of the parts removed.
Figure 4:
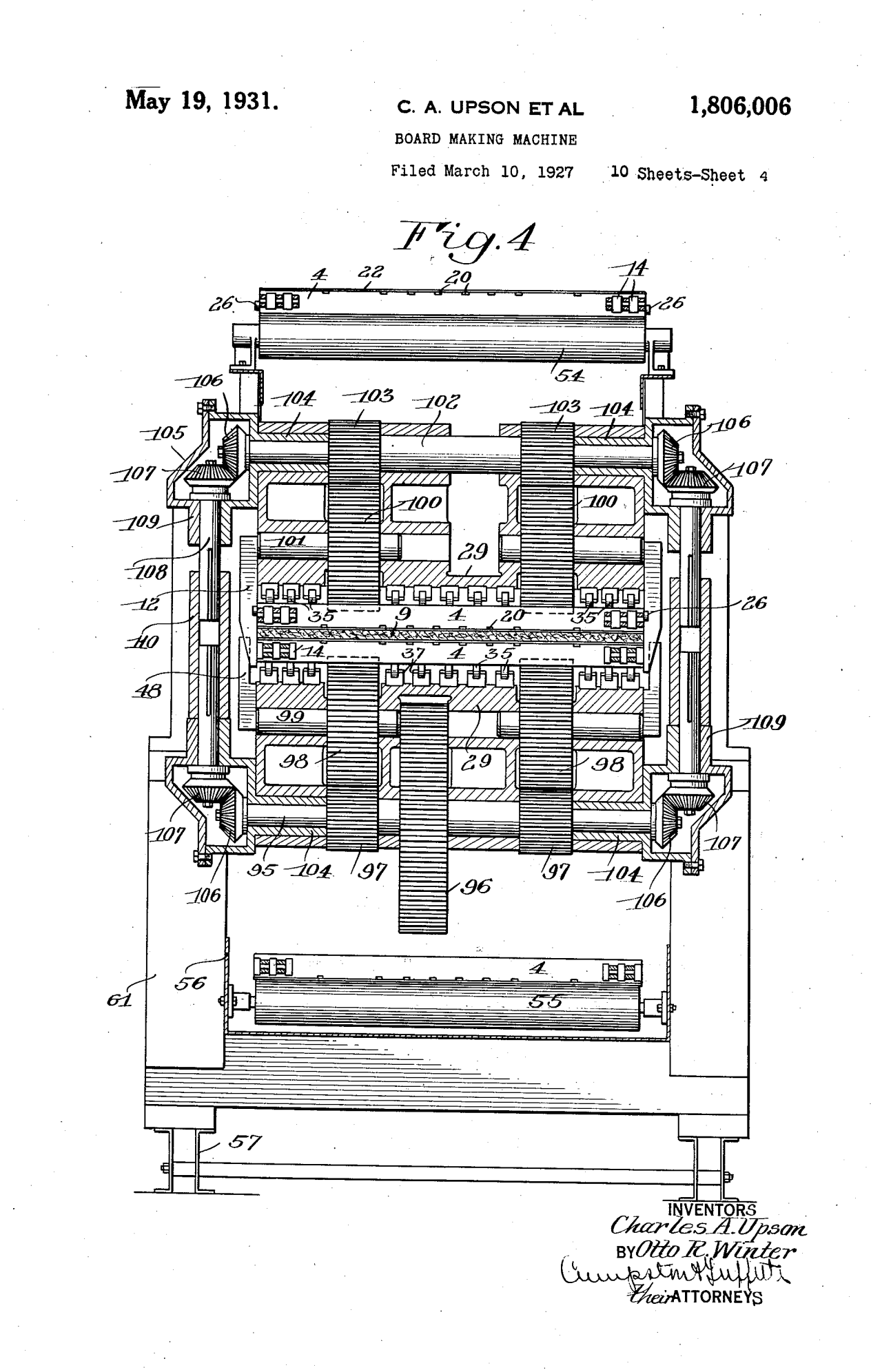

The upper reach of the upper flight A above the top bed is best shown in Figures 1, 2 and 4 supported during its travel between the band wheels by a plurality of rollers 54 mounted on the top bed frame. These are preferably covered with rubber or some suitable material to reduce the noise of the travel of the flight thereover. The corresponding lower reach of the lower flight B is similarly supported upon rollers 55 carried in a trough 56 (Figures 1 and 4) which is inclined and catches most of the drainage from the machine. The trough is suitably mounted within the main frame that is about to be described. These rollers 55, being constantly deluged with water we prefer to make of wood and, indeed, both sets of rollers 54 and 55 may be best made of wood, re-inforced by steel tubes inside and mounted on self aligning ball bearings.

*General construction*

The present machine as constructed by us weighs over forty tons and is, therefore, preferably mounted with its base frame 57 (Figures 1, 2 and 4) imbedded in a concrete base 58 a continuation of which 59 carries the driving motor 60. The supports for the upper frame 29, its band wheels and flight A of the compression chain must be such as to adequately support the tremendous weight thereof and to, at the same time, provide adjustability whereby one flight may be adjusted relatively to the other either bodily or at the two ends. In other words, the degree of separation of the two frames 29 controls both the size of the pressure or forming chamber 9 and, by tilting one end of the upper frame relatively to the lower, controls the convergence of the flights A and B which form the pressure chamber. Relative movement of the forward ends of the frames carrying the band wheels 5 and 6 toward or from each other regulates the thickness of the product board as it issues from the machine while relative movement of the rear band wheels 7 and 8 regulates the volume of stock that can be introduced at the feed end. We therefore, so support the lower pressure bed frame 29 so that it is fixed and adjustably support the companion upper frame 29 so that it may be moved toward and from the first at both ends.

For these purposes the forward end of the base frame 57 carries upright frames 61 forming half of the bearings for a shaft 62 that carries the band wheels 6. A vertical frame 63 is mounted on this lower frame as shown and provides the other half of the bearings while at its upper end it in turn carries the third frame 64 which, in conjunction with it forms a bearing for the shaft 65 of the upper band wheels 5. The three frames just referred to are tied together at each side of the machine by draw bolts 66 which have nuts 67 and lock nuts 68 that hold the respective bearing halves together in each case. These draw bolts take the strain of the tremendous pressure at the delivery end of the machine which, exerted in the forming chamber 9 tends to separate the upper and lower flights and their carrying frames. The shafts 62 and 65 of course extend through and support the forward ends of the carrying frames 29 themselves for which purpose these frames are provided at this point with suitable ribs and bearing lugs or bosses 30, as clearly shown in Figure 5.

The bearings for the upper band wheel and frame supporting shaft 65 are not directly supported by the frames 61, 63 and 64. Instead, by referring particularly to Figure 5, the shaft 65 at each end and adjacent to the frames carries a gear 70 having a hub 71 adapted to turn in the frames 63 and 64 and through which the shaft 65 passes eccentrically and in which it has its direct bearing. It is obvious that when this gear 70 and its hub 71 are rotated in each instance, it will raise and lower the shaft 65 carrying the upper frame 29, the band wheels 5 and 6 and the forward end of the upper flight A up or down relatively to the lower flight and regulate the width of the mouth of the delivery end of the machine and hence the thickness of the product that issues therefrom.

We effect this rotation of the gears and their eccentric hub bearings in the present instance by means of a short adjusting shaft 72 that extends through one of the frame pieces 63 and carries on its inner end a pinion 73 meshing with one of the gears 70. On its outer end it is provided with a worm gear 74, both gears being locked for rotation therewith. Secured to the frame piece 63 in conjunction with the shaft 72 is a bracket 75 having bearings supporting a relatively transverse shaft 76 carrying a worm 77 that meshes with the worm gear 74. One end of the worm shaft 76 projects at 78 as shown in Figures 1 and 2 to take a suitable crank (not shown). By turning this crank and shaft, the operator may, with ease, transmit motion extremely slowly to the gear 70 and thereby obtain a very fine adjustment of the bearing hub 71. On the other hand, because of the worm drive, the weight of the upper structure that is so supported cannot reverse or alter the adjusting mechanism.

Both bearings at the two ends of the shaft 65 must move in unison to keep the shaft 65 always parallel with the shaft 62. For this purpose the upper end of the second upper frame piece 64, in each instance, carries a bearing for a transverse shaft 79 having secured thereto gears 80 that respectively mesh with the two gears 70 carrying the eccentrics and cause them to move together.

A scale may be provided to regulate the adjustments just described, which scale, in the present instance consists of a circular series of openings 81 in the worm gear 74. A supplementary bracket 82 on the bracket 75 carries a suitable push pin 83 which takes into these openings selectively or successively to limit and define the adjustments made.

Corresponding adjustments at the rear or feeding end of the machine are similarly made but in a slightly different manner owing to the fact that, as will be seen, a floating bearing for the rear end of the upper frame 29 is required in view of the nature of the adjustments at the forward end. For these reasons a shaft 84 carrying the rearward band wheels 7 and the rear end of the upper pressure bed frame is carried at each end by a large swinging link 85 the lower end of which turns slightly on a lower fixed shaft 86. This shaft 86 is supported in bearings in a main frame piece 87 at each end and carries lower band wheels 8 for the lower flight B. Otherwise the construction here is very much the same as that at the forward end of the machine already described.

The link 85 is made in two parts, the upper end 88 being secured to the main part so that the parts jointly form a bearing for the hub 89 of a gear 90 that corresponds in arrangement and function to the gear 70 and the upper shaft 84 has an eccentric bearing in this hub 89. Its eccentricity is preferably greater than that of the forward shaft 65 because a greater range of movement between the two flights and the two frames is desirable at the feed end of the machine. The means for turning the gear 90 and hence the eccentric hub 89 to raise and lower the shaft and frame is substantially the same as that used at the forward end of the machine and hence this mechanism has not been shown in detail except as to parts appearing in Figures 1 and 2 which have been given the same reference numerals as identical parts in the forward adjusting mechanism. As before, the upper end 88 of the link carries a shaft 91 with a gear 92 meshing with gear 90 and turning gearing on the opposite side of the machine corresponding to parts 89, 90 and 92 on the opposite side of the machine so that the two end bearings of the shaft 84 will be moved in unison and maintain the upper and lower flights in parallelism, transversely of the machine.

*Driving mechanism*

We prefer to drive the machine from a central point as shown by the position of the motor 60 in Figure 2. The motor shaft 93 is shown in Figure 1 in connection with a gear train indicated generally at 94 which gears it down to a suitably timed rotation of a somewhat forwardly arranged drive shaft 95 carrying the terminal gear 96 of the train (see Figure 4). This main driving shaft 95 also has fixed thereto a pair of pinions 97 meshing with a pair of bull gears 98 each mounted on an individual axle 99 having suitable bearings in the lower pressure bed frame 29. These bull gears, so driven, project through the openings 46 in the bed frame before described and mesh with the rack of the lower flight member B provided by the teeth 28 on the link bars 4 also previously described.

It is to be observed that we have arranged the point of driving contact between the bull gears and the upper and lower flights at a point forwardly of the machine where the pressure upon the flights from the forming chamber has increased almost to the maximum and the drag is greatest.

A floating power transmitting means is provided for driving the upper flight or pressure member A in exactly the same manner. For this purpose the upper frame 29 is also provided with bull gears 100 on axles 101 driven from a main driving shaft 102 through pinions 103. The end bearings of the drive shaft 95 and 102 are in sleeves 104 formed on gear boxes 105 secured to each frame at both sides of the machine. These gear boxes contain bevel gears 106 on the ends of the drive shafts 95 and 102 meshing with bevel gears 107 fixed to slip-shafts 108 turning in bearing bosses 109 on the gear boxes 105. The respective pairs of slip-shafts 108 are interlocked for rotation together by a floating sleeve 110 to which they are both splined, so that they may have a relative endwise movement. This endwise movement is adaptable to and required by the relative adjustment of the frames 29 as is the pivoting movement of the sleeves 104 in the frames. In this way the upper and lower flights constituting the upper and lower walls of the pressure chamber 9 are driven in synchronism and it is to be observed that each flight, through the bull gears, has two points of driving contact that balance the pulling strain and it is also to be observed that, through the floating gearing, there are driving connections at both ends of the two drive shafts 95 and 102.

*Other features of the machine*

The two endless screens 25 before referred to as accompanying the respective flights A and B and providing the actual surface contact with the product as it is formed in the pressure chamber are carried, except as they adhere to the faces of the flights and at front and back of the machine, over jockey pulleys 111 and 112 for the upper flight and jockey pulleys 113 and 114 for the lower flight to give these screens their proper direction and clearance (see Figures 1 and 2). The pulley 111 (these pulleys are rollers extending across the machine in each instance) is supported by bracket arms 115 on the main frame piece 61. The pulley 112 is supported on a splash chest 116 to be later described and carried on the rear end of the upper frame 29. The pulley 113 is carried by and between the side walls of the splash pan or drainage trough 56 as is the pulley 114 at the rear end thereof or an extension 117 shown in the present embodiment.

Provision is made for spraying and cleaning these screens with water at points where they leave the surfaces of the respective pressure members and adjacent to the carrying pulleys just described with the exception of pulley 111. In each of the other instances a suitably mounted contiguous spray pipe 118 directs a spray of water against the screen and cleanses it of possible adhering fibers.

The pipe 118 that is adjacent to the pulley 112 at the rear end of the upper frame and flight member is enclosed by the splash chest 116 before referred to which traps the water and directs it downwardly and forwardly to join the main drainage.

The arrangements for feeding the stock at the rear end of the machine into the large end of the forming and pressure chamber 9 constitute, as before stated the subject matter of my prior application. It is, therefore, sufficient to say further herein and with reference particularly to Figure 2 that the agitator shown at 3 in Figure 7 is preferably driven independently of the main driving connections of the machine by a separate motor 119 mounted upon a table 120 on the bed 58 and bed frame 57 connected with the agitator shaft through a suitable belt and pulley transmission indicated generally at 121.

*Delivery mechanism*

Referring more particularly to Figure 6, it is apparent that the link bars 4 of the flights, traveling on the peripheries of the delivery band wheels 5 and 6 present flat surfaces of substantial extent that are tangent to these peripheral surfaces. There is hence a rocking movement of each bar as it tilts over the dead center between the band wheels at the point of tangency of the flight as a whole with the band wheel where the bars are straightened out to constitute the plane surfaces of the pressure chamber. This is not so much the case with the upper flight where, as shown in the figure, the bars remain flat or horizontal of their own weight after passing the dead center. On the lower flight, however, there is a tendency for each individual bar to heel over and make a dent or heel mark at intervals in the product board. We counteract this tendency by means of the following mechanism:

Still referring to Figure 6, the gear 96 on drive shaft 95 meshes with a pinion 121 fixed to a transverse shaft 122 which also has fixed thereto a cam 123. Traveling on this cam is the roller 124 on an arm 125 of a bell crank lever 126 pivoted on a shaft 127. Connected to this bell crank by a pivoted link 128 is a bell crank lever 129 which has a pivot 130 on the median line of the band wheel 6. The mechanism just described is duplicated at the two sides of the machine and the bell cranks 129 are connected by a bar 130 providing a wear surface adapted to take contact with the under sides of the link bars 4. Through the gearing described, the timing of the shafts 122 and the cam 123 carried thereby is such that as each link bar 4 passes beyond the dead center of the band wheel 6 it will be engaged by an upward thrust of the cross bar 130 which will continue to support it, momentarily, in the plane of the lower flight bars B of the compression chamber wall until the portion of the product board X which it has supported has also passed so far beyond the median line or dead center that it can no longer be injured by the tilting of the link bar which then occurs in the position shown at Y in Figure 6. In other words the bell crank 129 constitutes a sort of an automatically timed "kicker" which prevents each link bar 4 from passing too soon from a plane to a tilted peripheral position on the band wheel.

The plates 131 shown in Figure 2 and which are distinguishable by a comparison of that figure with Figure 1 are merely splash plates suitably secured to the supporting frame or fixed portion of the machine to prevent the great volume of water initially expressed from the feed end of the pressure chamber 9 from squirting laterally and causing it to drop immediately to the bottom drip pan or drainage trough 56. In this connection it may be here stated that, as in all paper making and allied machinery where an excess of water is present in the stock, the whole machine of the present embodiment of the invention is built to withstand and to operate under conditions under which all parts are continually drenched but the drainage arrangements successively described throughout this specification are sufficient to ultimately direct the expressed water into the main drainage trough 56 from which it is conducted away.

We claim as our invention:

1. In a machine of the character described, the combination with a pressure chamber formed by upper and lower flights of pressure bars linked together in endless chains including means for driving the latter, said flights being convergent toward the delivery end of the machine, of pressure beds supporting the reaches of the chains which constitute opposite walls of the pressure chamber, said beds being provided with bearing rollers at the feeding end of the pressure chamber and the wider end of the latter, and with relatively stationary surfaces at the delivery or narrow end of the pressure chamber upon which the undersides of the pressure bars are received after they have left the said roller bearings.

2. In a machine of the character described, the combination with a pressure chamber formed by upper and lower flights of pressure bars linked together in endless chains including means for driving the latter, said flights being convergent toward the delivery end of the machine, of pressure beds supporting the reaches of the chains which constitute opposite walls of the pressure chamber, said beds being provided with bearing rollers at the feeding end of the pressure chamber and the wider end of the latter, and with relatively stationary surfaces at the delivery or narrow end of the pressure chamber formed by a plurality of renewable and detachable wear plates upon which the undersides of the pressure bars are received after they have left the said roller bearings.

3. In a machine of the character described, the combination with a pressure chamber formed by upper and lower flights of pressure bars linked together in endless chains and means for driving the latter, of upper and lower pressure frames supporting the said flights and adjustable relatively to each other, cheek plates constituting the side walls of the pressure chamber secured to one of said frames, and reinforcing brackets carried by the other frame and having sliding engagement with the cheek plates.

4. In a machine of the character described, the combination with a pressure chamber formed by upper and lower flights of pressure bars linked together in endless chains, said flights being convergent toward the delivery end of the machine, of pressure beds supporting the reaches of the chains which constitute opposite walls of the pressure chamber, said beds being provided with bearing rollers at the feeding end of the pressure chamber and the wider end of the latter, and with relatively stationary surfaces at the delivery or narrow end of the pressure chamber upon which the undersides of the pressure bars are received after they have left the said roller bearings, and driving means for the said chains engaging the same at a point adjacent to the interval between the roller bearings and the surface bearings on the bed.

5. In a machine of the character described, the combination with a pressure chamber formed by upper and lower flights of pressure bars linked together in endless chains, of pressure beds supporting the reaches of the chains and driving means directly engaging said chains at points arranged forwardly of the beds, said driving means being independent of the supporting devices of the chains.

6. A machine of the character described embodying a pressure chamber formed by upper and lower flights of pressure bars linked together in endless chains, the elements of said chains, each comprising a hollow body portion having a foraminous outer contacting face and drainage openings and being provided, on its opposite and under side with gear teeth adapted for engagement with a driving gear for the flight.

7. A machine of the character described embodying a pressure chamber formed by upper and lower flights of pressure bars linked together in endless chains, each of said pressure bars comprising a hollow body portion having interior longitudinal and transverse ribs and provided with drainage openings in said ribs and in the sides, ends and bottom thereof, and further provided with a foraminous outer contacting face.

8. A machine of the character described embodying a pressure chamber formed by upper and lower flights of pressure bars linked together in endless chains, each of said pressure bars comprising a body portion and an independent foraminous face plate secured thereto, the latter being provided with a plurality of fine slots, all of which run transversely of the bar, and means for driving the pressure bars in a direction longitudinally of the slots.

9. In a machine of the character described, the combination with a pressure chamber formed by upper and lower flights of pressure bars linked together in endless chains, of band wheels supporting said chains, one of said wheels being provided with an eccentric bearing and means for rotating said bearing to cause the band wheel and the chain carried thereby to move toward and from the opposed chain in adjustable relation.

10. In a machine of the character described, the combination with a pressure chamber formed by upper and lower flights of pressure bars linked together in endless chains, of band wheels supporting said chains, one of said wheels being provided with an eccentric bearing, of means embodying a worm and worm gear for rotating said bearing to cause the band wheel and the chain carried thereby to move toward and from the opposed chain in adjustable relation.

11. In a machine of the character described, the combination with a pressure chamber formed by upper and lower flights of pressure bars linked together in endless chains, of band wheels at each side of the machine supporting said chains, said wheels being provided with eccentric bearings formed by hubs having gears fixed thereto, of means embodying a shaft having pinions meshing with both of said gears to simultaneously move the band wheels and the chain carried thereby relatively to the other chain.

12. In a machine of the character described, the combination with a pressure chamber formed by upper and lower flights of pressure bars linked together in endless chains, shafts, and band wheels carried by the shafts and supporting said chains, of a pair of relatively movable bed frames through which the respective shafts extend, supporting frames for the shafts and draw bolts connecting the frames.

13. In a machine of the character described, the combination with a pressure chamber formed by upper and lower flights of pressure bars linked together in endless chains, shafts, and band wheels carried by the shafts and supporting said chains, of a pair of relatively movable bed frames through which the respective shafts extend, supporting frames for the shafts and draw bolts connecting the frames, the said draw bolts also constituting means for drawing together the bearings of the shafts.

14. In a machine of the character described, the combination with a pressure chamber formed by upper and lower flights of pressure bars linked together in endless chains, of upper and lower pressure beds upon which the said chains are respectively mounted for travel, means for moving one end of the upper bed toward and from the other, and a floating support for the other end of said upper bed permitting a pivoting movement thereof relatively to the lower bed.

15. In a machine of the character described, the combination with a pressure chamber formed by upper and lower flights of pressure bars linked together in endless chains, of upper and lower pressure beds upon which the said chains are respectively mounted for travel, a frame supporting one end of the upper bed and means associated with said frame embodying a shaft and an eccentric bearing therefor for adjusting said end of the upper frame and its flight of chains relatively to the lower bed and its flight.

16. In a machine of the character described, the combination with a pressure chamber formed by upper and lower flights of pressure bars linked together in endless chains, of upper and lower pressure beds upon which the said chains are respectively mounted for travel, a frame supporting one end of the upper bed and means associated with said frame embodying a shaft, an eccentric bearing therefor, and a manually operable worm and worm gear for rotating said eccentric bearing for the shaft for adjusting said upper bed and its flight of chains relatively to the lower bed and its flight.

17. In a machine of the character described, the combination with a pressure chamber formed by upper and lower flights of pressure bars linked together in endless chains, of upper and lower pressure beds upon which the said chains are respectively mounted for travel, a frame supporting said beds, an eccentric bearing in said frame, a shaft carrying a band wheel turning in said bearing and upon which band wheel the upper flight of chains is carried, means for rotating the eccentric bearing and draw bolts adjacent to the bearing connecting said frame on opposite sides of said beds.

18. In a machine of the character described, the combination with a pressure chamber formed by upper and lower flights of pressure bars linked together in endless chains, of upper and lower pressure beds upon which the said chains are respectively mounted for travel, a frame supporting one end of the upper bed, an eccentric bearing in said frame, a shaft carrying band wheels turning in said bearing and upon which band wheels the upper flight of chains is carried, means for rotating the eccentric bearing, a link pivoted to the main frame at the opposite end of the pressure beds and carrying an eccentric bearing, a shaft turning in said last mentioned bearing and supporting the other end of the upper bed, and means associated with the link for adjusting said last mentioned eccentric bearing.

19. In a machine of the character described, the combination with a pressure chamber formed by upper and lower flights of pressure bars linked together in endless chains, of upper and lower pressure beds upon which the said chains are respectively mounted for travel, shafts and band wheels mounted upon the respective pressure beds at one end, a supporting frame therefor upon which the upper shaft is adjustable relatively to the lower shaft, and a pivoting support for the opposite end of the upper pressure bed upon which the latter is adjustable toward and from the corresponding end of the lower pressure bed.

20. In a machine of the character described, the combination with a pressure chamber formed by upper and lower flights of pressure bars linked together in endless chains, of a bed frame, fixed shafts carried thereby supporting a lower pressure bed upon which the lower flight of chains is mounted for travel, eccentric bearings in said frame, a shaft turning in said eccentric bearings and provided with band wheels supporting the upper flight of chains at one end, means for rotating said bearing to adjust said end of the upper flight of chains relatively to the corresponding end of the lower flight of chains, a link pivoted on said fixed shaft at the opposite end of the lower bed and carrying an eccentric bearing, a shaft turning in said last mentioned eccentric bearing and provided with band wheels supporting that end of the upper flight of chains and means associated with the link for rotating said last mentioned eccentric bearing.

21. In a machine of the character described, the combination with a pressure chamber formed by upper and lower flights of pressure bars linked together in endless chains, of upper and lower pressure beds upon which the said chains are respectively mounted for travel, means for adjusting the upper bed relatively to the lower bed, driving mechanism on the upper bed for the upper flight of chains, driving mechanism on the lower bed for the lower flight of chains, and a sliding transmission mechanism connecting the driving mechanism of the lower flight with that of the upper flight.

22. In a machine of the character described, the combination with a pressure chamber formed by upper and lower flights of pressure bars linked together in endless chains of upper and lower pressure beds upon which the said chains are respectively mounted for travel, means for adjusting the upper bed relatively to the lower bed, driving mechanism on the upper bed for the upper flight of chains, driving mechanism on the lower bed for the lower flight of chains, and a sliding transmission mechanism connecting the driving mechanism of the lower flight with that of the upper flight, the latter consisting of shafts carrying bevel gears and connected by a floating sleeve to which the respective shafts are splined.

23. In a machine of the character described, the combination with a pressure chamber formed by upper and lower pressure members, of upper and lower pressure beds for supporting said members, the lower bed being fixed, of eccentric means for adjusting one end of the upper bed relatively to the corresponding end of the lower bed, and means pivoting on the opposite end of the lower bed for supporting the opposite end of the upper bed.

24. In a machine of the character described, the combination with a pressure chamber formed by upper and lower pressure members, of upper and lower pressure beds for supporting said members, the lower bed being fixed, of eccentric means for adjusting one end of the upper bed relatively to the corresponding end of the lower bed, and means pivoting on the opposite end of the lower bed for supporting the opposite end of the upper bed, said means comprising an eccentric bearing and devices for turning said bearing to adjust that end of the upper frame relatively to the lower frame.

25. In a machine of the character described, the combination with a pressure chamber formed by upper and lower pressure members, and upper and lower frames upon which they are adapted to respectively travel, of eccentric bearings for the respective ends of the upper frame, one of which is fixed and the other of which is adapted to pivot upon the supports of the lower frame.

26. In a machine of the character described, the combination with a pressure chamber formed by upper and lower pressure members, and upper and lower frames upon which they are adapted to respectively travel, of eccentric bearings for the respective ends of the upper frame, one of which is fixed and the other of which is adapted to pivot upon the supports of the lower frame, and independent means for adjusting each of the eccentric bearings.

27. In a machine of the character described, the combination with a pressure chamber formed by upper and lower flights of pressure bars linked together in endless chains, of upper and lower pressure beds, shafts carried at the two ends of both beds provided with band wheels upon which the aforesaid chains are respectively mounted to travel, eccentric bearings for the shafts of said upper bed, a support for the eccentric bearings at the forward end of the machine, links pivoting upon the lower shaft at the opposite end of the machine and supporting the eccentric bearings for the corresponding upper shaft, and means associated with said links and with the aforesaid frame for adjusting the respective eccentric bearings.

28. In a machine of the character described, the combination with a pressure chamber formed by upper and lower flights of pressure bars linked together in endless chains, each bar having a flat pressure contacting surface, of band wheels over which the said chain and the link bars pass at the delivery end of the pressure chamber and a device for supporting the advancing edge of a link bar and preventing it from tilting until the link has passed the median line of the said band wheels.

29. In a machine of the character described, the combination with a pressure chamber formed by upper and lower flights of pressure bars linked together in endless chains, each bar having a flat pressure contacting surface, of band wheels over which the said chain and the link bars pass at the delivery end of the pressure chamber, a support intermittently engaging each link bar as it passes across the median line of the said band wheels to hold it tangential thereto for a period beyond its passing over said line, and suitably timed actuating mechanism for causing the support to engage the pressure bars successively.

30. In a machine of the character described, the combination with a pressure chamber formed by upper and lower flights of pressure bars linked together in endless chains, each bar having a flat pressure contacting surface, of band wheels over which the said chain and the link bars pass at the delivery end of the pressure chamber, a support intermittently engaging each link bar as it passes across the median line of the said band wheels to hold it tangential thereto for a period beyond its passing over said line, driving mechanism for the chains and mechanism actuated by the driving mechanism in timed relationship thereto for actuating the support into contact with the successive pressure bars.

31. In a machine of the character described, the combination with a pressure chamber formed by upper and lower flights of pressure bars linked together in endless chains, each bar having a flat pressure contacting surface, of band wheels over which the said chain and the link bars pass at the delivery end of the pressure chamber, a pivoted support intermittently engaging each link bar as it passes across the median line of the said band wheels to hold it tangential thereto for a period beyond its passing over said line, driving mechanism for the chains and mechanism actuated by the driving mechanism in timed relationship thereto for actuating the support into contact with the successive pressure bars, said mechanism comprising a cam shaft and a link mechanism geared to the support.

32. In a machine of the character described, the combination with a pressure chamber formed by upper and lower flights of pressure bars linked together in endless chains, said flights being convergent toward the delivery end of the machine, of pressure beds supporting the reaches of the chains which constitute opposite walls of the pressure chamber, pressure blocks on said beds having countersunk faces projecting toward said chains, means received in said countersunk faces for securing said blocks to said beds and wear plates secured to said blocks over said countersunk faces and substantially covering said blocks for wearing engagement with said chains.

33. In a machine of the character described, the combination of a pressure chamber formed by upper and lower endless chains, upper and lower pressure beds upon which the said chains are respectively mounted for travel, means for adjusting said beds relative to each other to vary the size of said pressure chamber, and driving mechanism on said beds for said chains comprising opposed bearings rotatably carried on said beds, respectively, shafts rotatably mounted in said bearings, and extensible means connecting said shafts for driving one by the other in different positions of said beds relative to each other.

34. In a machine of the character described, the combination of a pressure chamber formed by upper and lower endless chains, upper and lower pressure beds upon which the said chains are respectively mounted for travel, means for adjusting said beds relative to each other to vary the size of said pressure chamber, and driving mechanism on said beds for said chains comprising opposed bearings rotatably carried on said beds, respectively, shafts rotatably mounted in said bearings, and a sleeve splined to said shafts for driving one by the other in the different positions of adjustment of said beds relative to each other.

CHARLES A. UPSON.
OTTO R. WINTER.